United States Patent
Tatsumi et al.

(12)

(10) Patent No.: US 6,678,111 B1
(45) Date of Patent: Jan. 13, 2004

(54) MAGNETIC TAPE RECORDING/ REPRODUCING APPARATUS HAVING A TAPE GUIDE POST MECHANISM IN THAT A TILT OF THE TAPE GUIDE POST IS RESTRICTED

(75) Inventors: Naoki Tatsumi, Atsugi (JP); Kazuya Tamura, Isehara (JP); Masahiro Harima, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/474,426

(22) Filed: Dec. 29, 1999

(30) Foreign Application Priority Data

Jan. 18, 1999 (JP) .............................. 11-009769

(51) Int. Cl.⁷ ..................... G11B 15/665; G11B 15/675
(52) U.S. Cl. .......................... 360/85; 360/95; 360/96.5; 360/130.21
(58) Field of Search ................... 360/85, 95, 96.5, 360/130.21, 130.22, 130.23; 242/338.4, 338

*Primary Examiner*—Craig A. Renner
(74) *Attorney, Agent, or Firm*—Ladas & Parry

(57) ABSTRACT

A magnetic tape recording/reproducing apparatus for recording information to and reproducing information from a magnetic tape extracted from a cassette loaded in the apparatus, the magnetic tape recording/reproducing apparatus having a tape guide post mechanism having a tape guide post provided on a rotatably supported tape guide post arm which rotates until pressing against a stopper, the tape guide post extracting a magnetic tape from the cassette loaded in the apparatus; and a contacting part provided on a portion of the arm, the contacting part contacting a bottom surface of the loaded cassette when the arm is rotated so as to extract the magnetic tape from the cassette and the arm restricting a tilting of the arm in a direction in which the tape guide post tilts in a state in which the arm presses against the stopper.

6 Claims, 8 Drawing Sheets

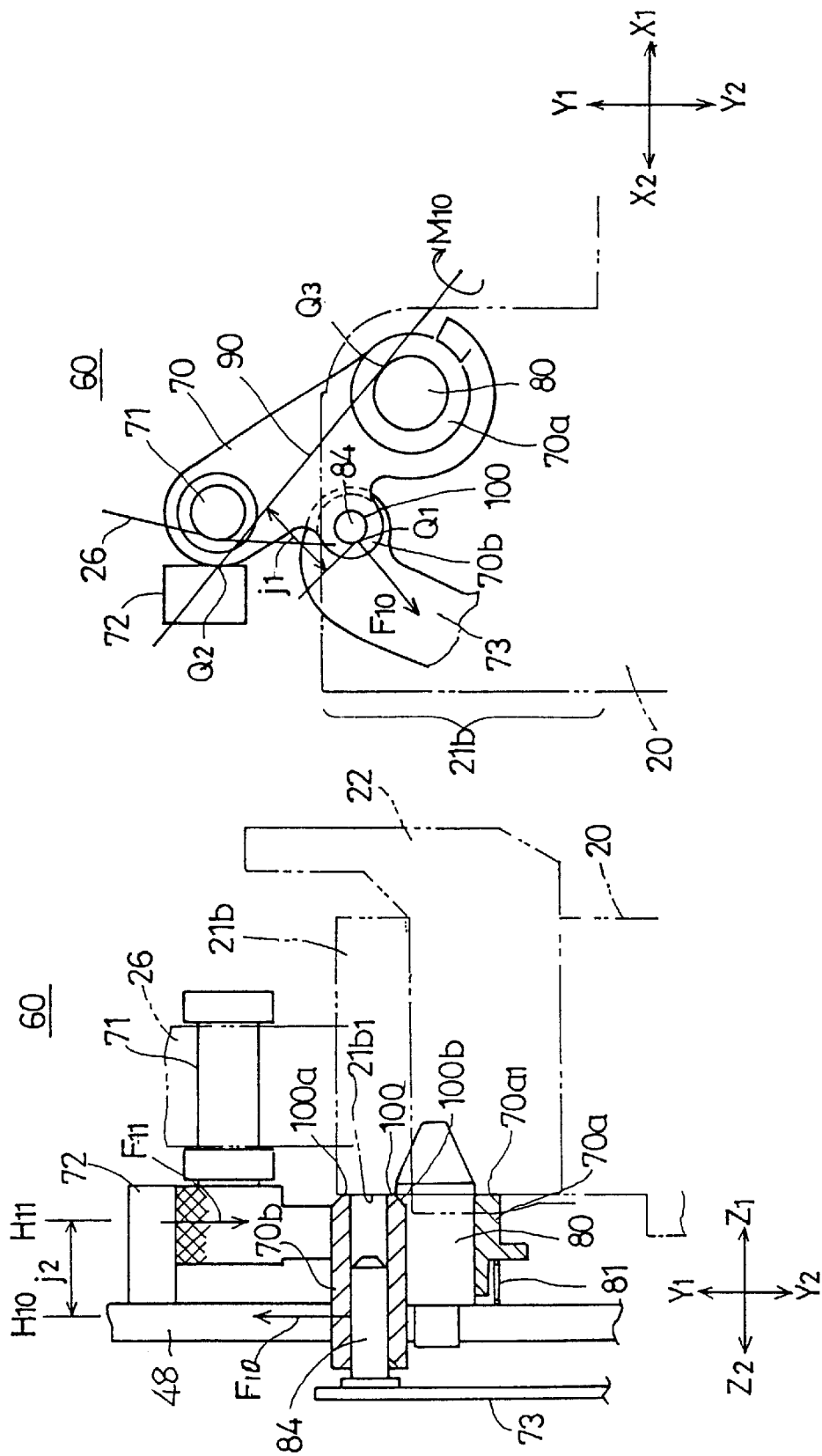

MAGNETIC TAPE RECORDING/REPRODUCING APPARATUS HAVING A TAPE GUIDE POST MECHANISM IN THAT A TILT OF THE TAPE GUIDE POST IS RESTRICTED

BACKGROUND OF THE INVENTION

1. Field of the Invention

The present invention relates generally to a magnetic tape recording and/or reproducing apparatus (hereinafter referred to as a magnetic tape recording/reproducing apparatus) having a tape guide post mechanism, and more particularly, to a magnetic tape recording/reproducing apparatus having a tape guide post mechanism for preventing tilting of the tape guide post that extracts magnetic tape from a cassette loaded in a digital audio tape recorder (hereinafter "DAT") streamer used as a large-capacity external memory back-up device for computers.

2. Description of the Related Art

The DAT streamer uses a DAT tape cassette, with the magnetic tape being extracted from the DAT tape cassette via the tape guide post. Recording to and reproduction from the magnetic tape is carried out by a high-speed rotary drum, that is, a rotary head, the magnetic tape being driven between a capstan and a pinch roller and guided by a tape guide post. In order for the magnetic tape to run steadily the tape guide post must not be tilted. If the tape guide post is tilted, then unwanted force is generated in a direction of a width of the magnetic tape and, particularly when the tilt is great, the edges of the magnetic tape may be damaged and/or the tracking may slip, making it impossible to record and reproduce properly.

FIG. 1 and FIGS. 2A and 2B show a conventional tape guide post mechanism 10 of a supply reel side of a DAT streamer. As shown in the diagrams, the tape guide post mechanism 10 has a tape guide post arm 11, a tape guide post 12, a stopper 13, a pull arm 14, and the like. The arm 11 has a bearing part 11a on a base part side, a tape guide post 12 fixedly mounted on a forward edge side and a tube part 11b at a central part. The bearing part 11a is fitted to and rotatably supported by a pivot 16 provided on a chassis 15 not shown in the drawing. A pole 17 provided on an edge of the pull arm 14 is fitted to the tube part 11b from a lower side of the tube part 11b.

After a DAT tape cassette 20 has been loaded, the pull arm 14 is moved in a direction indicated by arrow A in FIG. 2A, the arm 11 is pulled by the pole 17 and is rotated in a direction indicated by arrow B around the pivot 16. The tape guide post 12 extracts a magnetic tape 26 from the tape cassette 20. A forward edge side of the arm 11 presses against the stopper 13 and in that state determines the positioning of the tape guide post 12. The magnetic tape 26 is extracted from the supply reel side of the tape cassette body and is guided directly thereafter by the tape guide post 12.

As shown in FIG. 2B, the pole 17 exerts a force F1 on the arm 11 at a height position H1 and the stopper 13 exerts a force F2 on the arm 11 at a height position H2. Between height position H1 and height position H2 there is a difference in height C and, accordingly, a moment M is exerted on the arm 11 tilting so as to rotate with respect to an axis 18 in an extending direction of the arm 11. As a result, the arm 11 tilts and the tape guide post 12 tilts in a direction indicated by arrow D. The tilting of the tape guide post 12 is, however, restricted by the engagement of the bearing part 11a with the pivot 16. Normally, any gap between the side, and a tube part 70b at a central part as shown in FIGS. 6A and 7B. For ease of illustration, in FIGS. 6A, 6B, 6C and 6D, the tape guide post 71 has been simplified. The arm 70 fits the bearing part 70a to a cassette positioning mount 80 that is provided on the sub-chassis 47 so as to rotatably support the bearing part 70a by the cassette positioning mount 80. Further, the bearing part 70a is pushed upward in a Z1 direction by a spring 81.

If, however, for example, the gap between the bearing part 11a and the pivot 16 happens to be large, then the tilt of the tape guide post 12 becomes large as well, and can make the run of the magnetic tape unstable, generating unwanted force in a direction of a width of the magnetic tape and, on occasion, throwing off the tracking of the tape and interfering with proper recording and reproduction.

To counter this problem it is possible to increase the length of the pole 17 and thereby decrease the difference in height C described above. However, in doing so another problem arises, in that, when the pull arm 14 is pulled in the direction indicated by arrow A the pole 17 begins to tilt and a force exerted at the base of the pole 17 increases, with the possibility that the pull arm 14 deforms so as to twist. Accordingly, it is not desirable to increase the length of the pole 17.

SUMMARY OF THE INVENTION

Accordingly, it is an object of the present invention to provide an improved and useful magnetic tape recording/reproducing apparatus in which the disadvantages described above are eliminated.

Another and more specific object of the present invention is to provide a magnetic tape recording/reproducing apparatus that uses a cassette loaded in the apparatus to restrict the tilt of the tape guide post.

Another and more specific object of the present invention is to provide a magnetic tape recording/reproducing apparatus for recording information to and reproducing information from a magnetic tape extracted from a cassette loaded in the apparatus by the tape guide post that uses the loaded cassette to restrict the tilt of the tape guide post so that the tape guide post does not tilt when the tape guide post has reached a final position.

The above-described objects of the present invention are achieved by a magnetic tape recording/reproducing apparatus for recording information to and reproducing information from a magnetic tape extracted from a cassette loaded in the apparatus, the magnetic tape recording/reproducing apparatus having a tape guide post mechanism comprising:

a tape guide post provided on a rotatably supported tape guide post arm which rotates until pressing against a stopper, the tape guide post extracting a magnetic tape from the cassette loaded in the apparatus; and a contacting part provided on a portion of the arm, the contacting part contacting a bottom surface of the loaded cassette when the arm is rotated so as to extract the magnetic tape from the cassette and the arm restricting a tilting of the arm in a direction in which the tape guide post tilts in a state in which the arm presses against the stopper.

According to the invention described above, by using the loaded cassette it is possible to effectively restrict the tape guide post so that the tape guide post does not tilt when the tape guide post has reached a final position.

Additionally, according to the invention described above, by contacting a top surface against the bottom surface of the loaded cassette, the arm restricts the tilting of the tape guide post, so the effect of variations in the quality of the fit between the arm bearing part and the pivot as described above can be eliminated and a tilt of the tape guide post can be prevented. That is, it is possible to restrict the tilt of the tape guide post even in the event that the fit between the arm bearing part and the pivot is poor, that is, the gap between the bearing part and the pivot is large.

Other objects, features and advantages of the present invention will become more apparent from the following detailed description when read in conjunction with the accompanying drawings.

BRIEF DESCRIPTION OF THE DRAWINGS

FIGS. 5A and 5B show a state of a tape guide post mechanism at a supply reel after tape loading is completed;

DESCRIPTION OF THE PREFERRED EMBODIMENT

A description will now be given of an embodiment of the present invention, with reference to the accompanying drawings.

Figure 1:
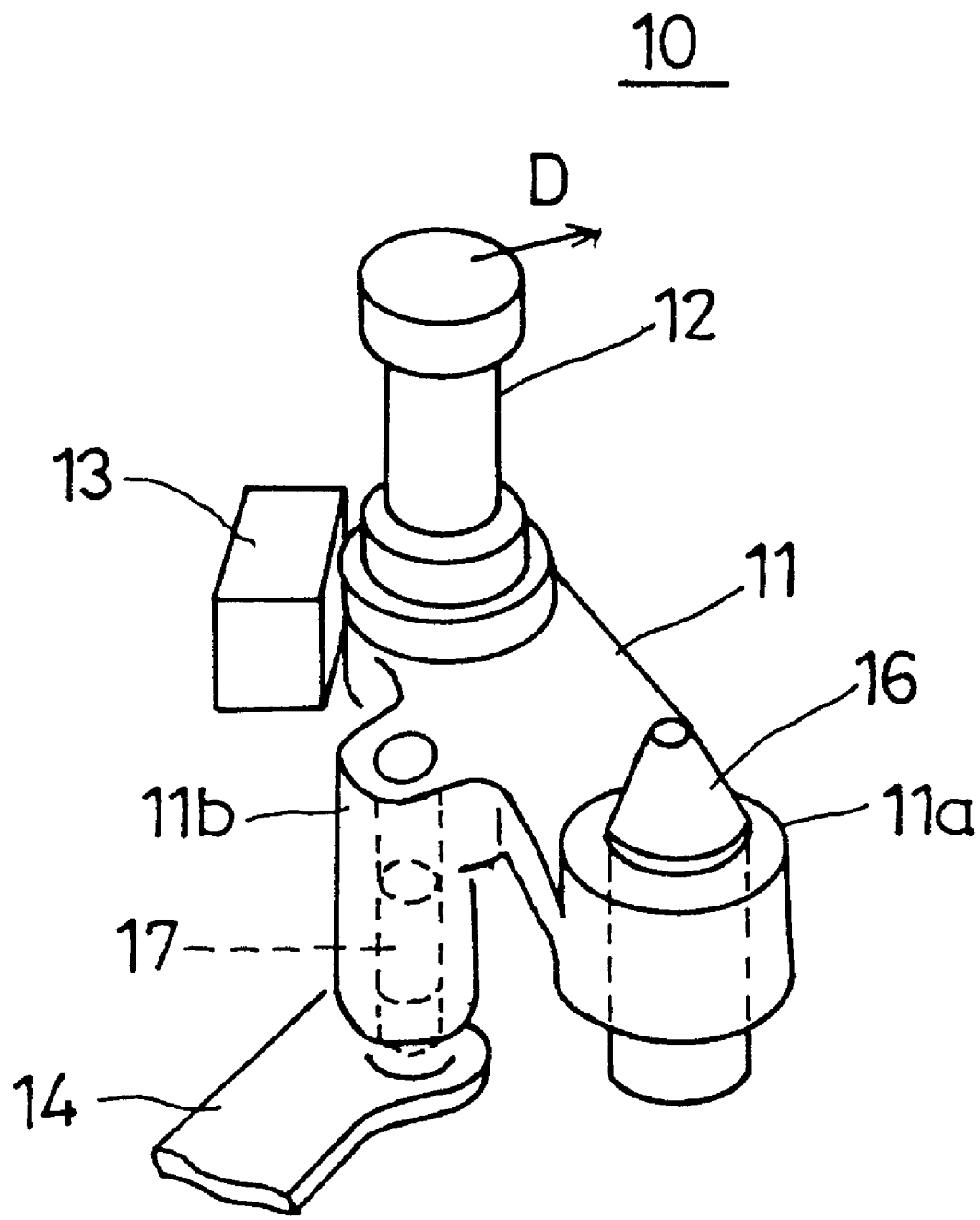
FIG. 1 is a perspective view of the conventional tape guide post mechanism.
Figure 2A:
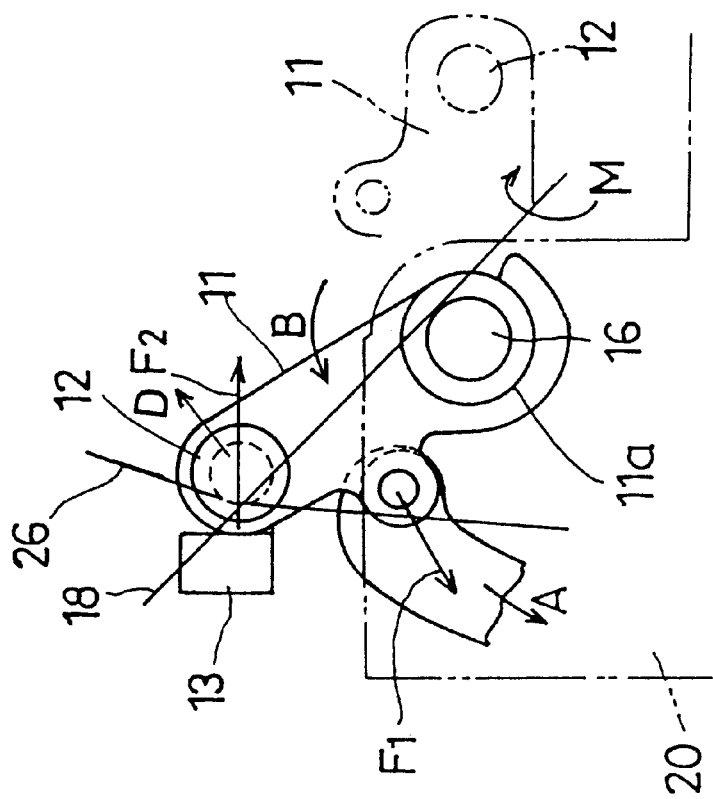
FIGS. 2A and 2B show a state of the tape guide post mechanism of FIG. 1 after operation.
Figure 2B:
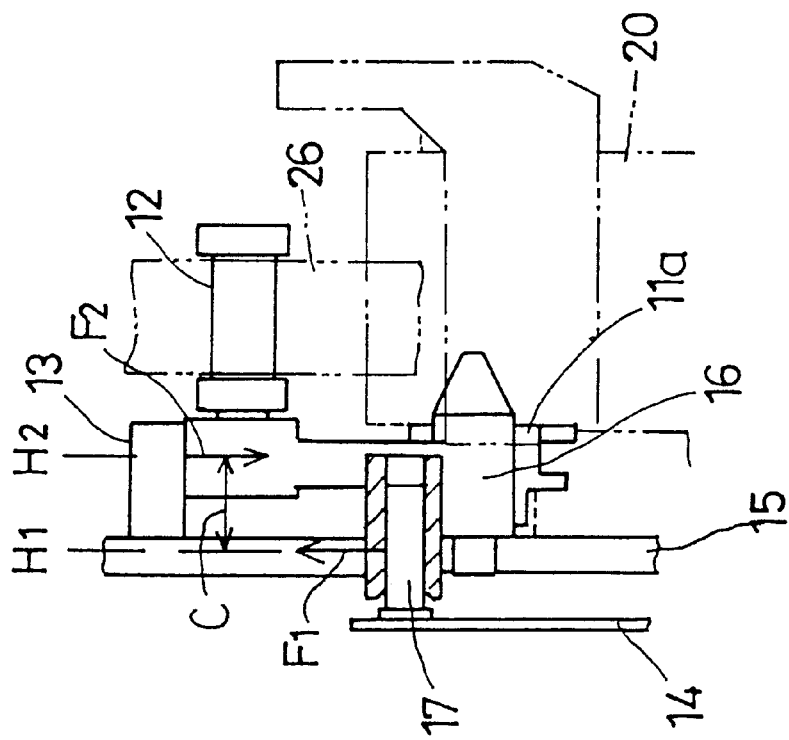
Figure 3:
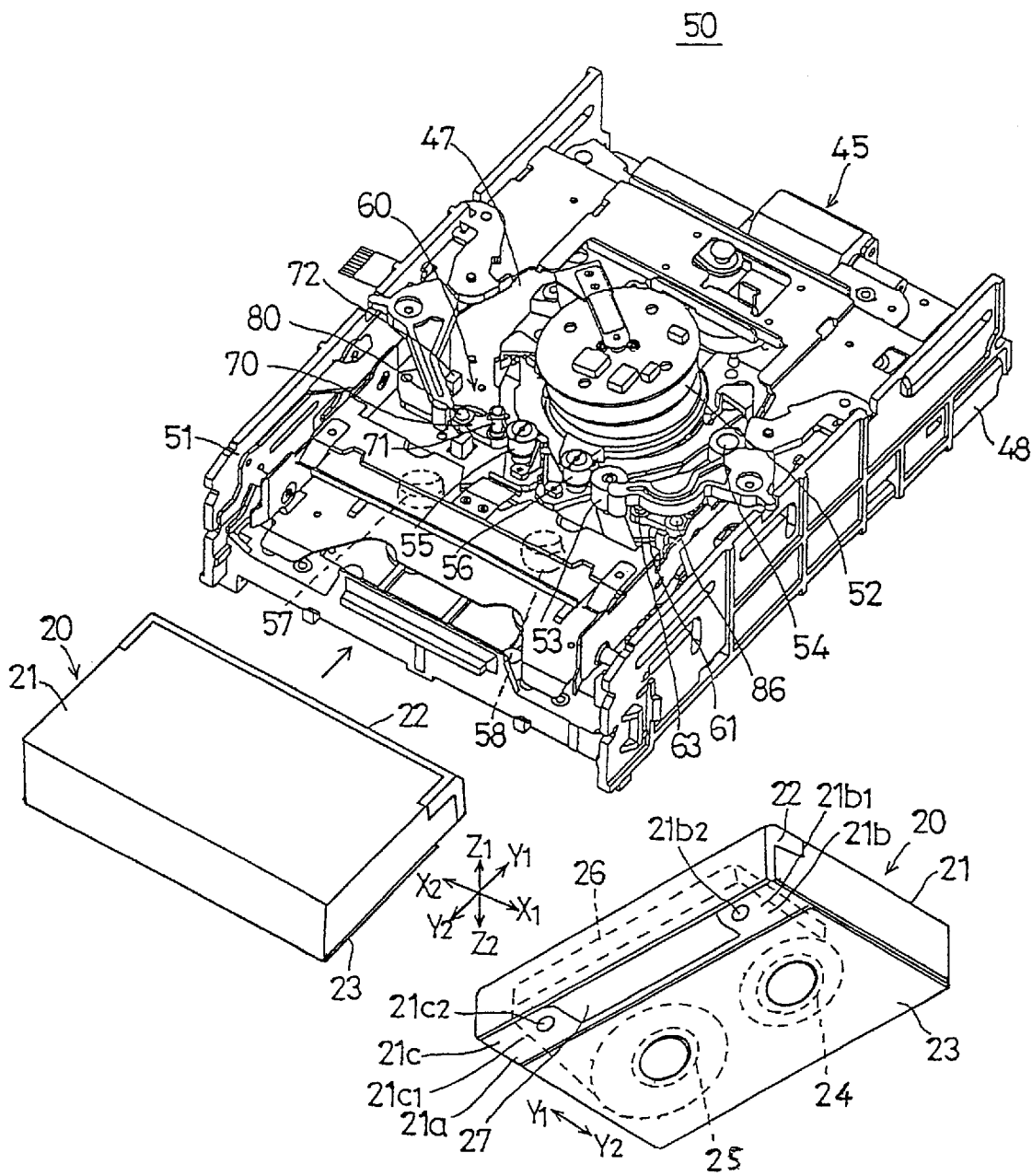
FIG. 3 is a diagram showing the overall structure of a DAT streamer according to the present invention.

For ease of explanation, a summary description will first be given of a DAT streamer 50 according to the present invention, with reference to FIGS. 3 and 4.

The DAT streamer 50 has a chassis 48, on which are provided a DAT tape cassette loading mechanism 51 for loading a DAT tape cassette 20; a rotary drum 52 having a rotary head 52a not shown in the diagram; a pinch roller 53; a capstan 54; loading poles 55 and 56; a supply reel 57; a take-up reel 58; a supply reel tape guide post mechanism 60; a take-up reel tape guide post mechanism 61; and a tape loading mechanism 45. A sub-chassis 47 is provided on a top side of the chassis 48. A part of the supply reel tape guide post mechanism 60 and a part of the take-up reel tape guide post mechanism 61, as well as the loading poles 55, 56, are mounted on the sub-chassis 47.

The DAT tape cassette 20 comprises a tape cassette housing 21, a lid 22 located on a front edge of the housing 21, that is, on a side in a Y1 direction as indicated in the drawing, and a slider 23 located on a bottom surface 21a of the housing 21. The interior of the housing 21 contains a supply reel 24, a take-up reel 25 and a magnetic tape 26. The magnetic tape 26 is wound around each reel. For ease of illustration, the slider 23 is shown slid in a Y2 direction. A wide concavity 27 is formed on the Y1 side edge of the cassette housing 21. The tape cassette housing 21 has two extending portions 21b and 21c located on both sides of the concavity 27. These extending portions 21b, 21c have bottom surfaces 21b1 and 21c1, respectively, as well as positioning holes 21b2 and 21c2, respectively.

When the DAT tape cassette 20 is inserted lid 22 first into the DAT streamer 50 toward the Y1 direction the DAT tape cassette loading mechanism 51 operates and the DAT tape cassette 20 is moved first in the Y1 direction and then in a Z2 direction, and then loaded at a predetermined position in a state of being pressed downward. In the process of being loaded, the slider 23 is slid in the Y2 direction, opening the lid 22. Additionally, the supply reel 24 and the take-up reel 25 engage the supply reel spindle 57 and the take-up reel 58, respectively, and the pinch roller 53 and the loading poles 55, 56 enter into the concavity 27.

Figure 4:
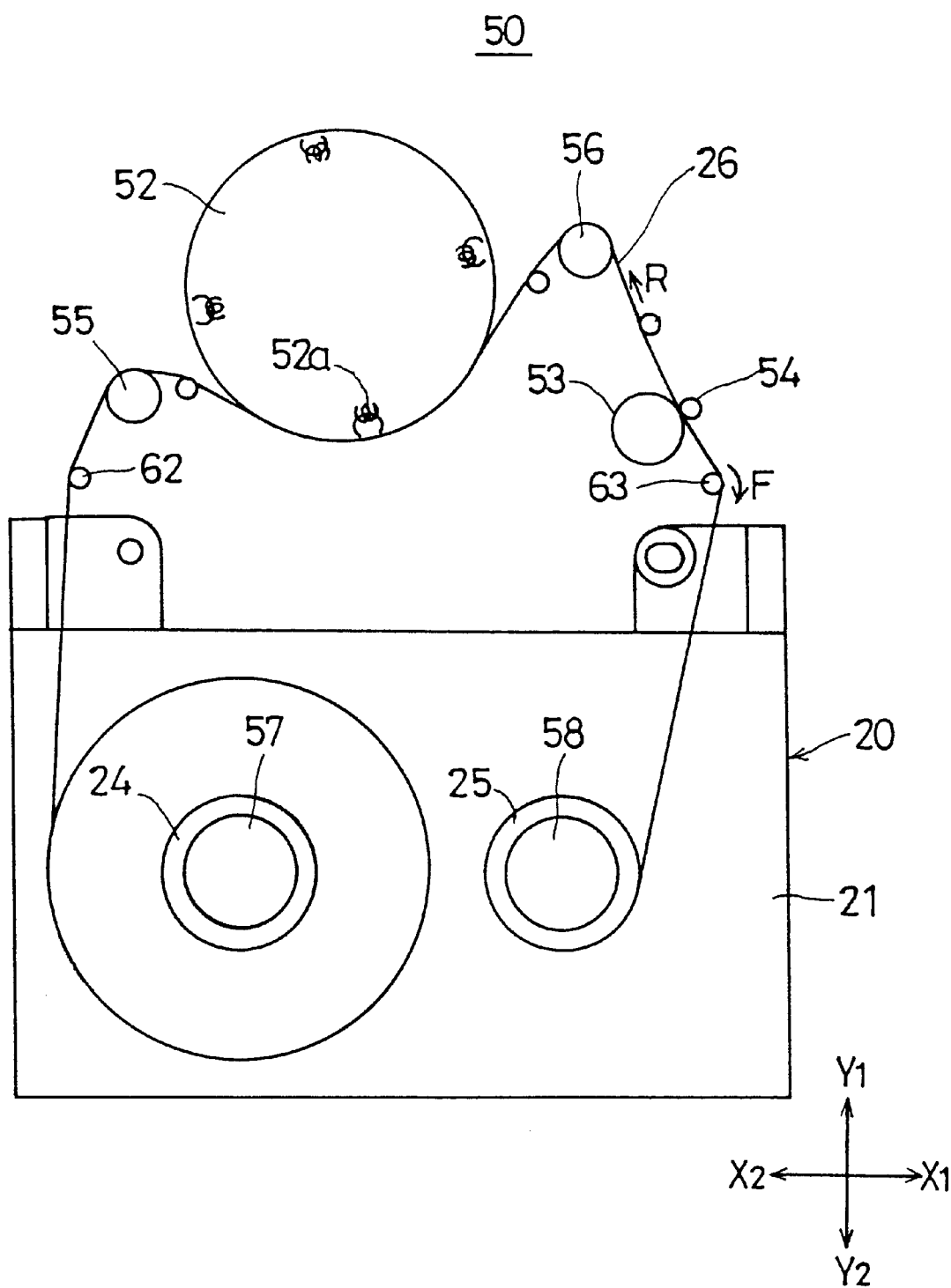
FIG. 4 is a schematic diagram of the tape pass when the DAT streamer shown in FIG. 3 is recording or reproducing.

Next, the DAT streamer 50 tape loading mechanism 45 operates and, as shown in FIG. 4, the magnetic tape 26 is extracted from the loaded DAT tape cassette 20 by the loading poles 55, 56, the supply reel tape guide post 62 and the take-up reel tape guide post 63, wound around the rotary drum 52 having the rotary head 52a and pressed against a capstan 54 rotated by the pinch roller 53. The magnetic tape 26 is guided by tape guide post 62, loading poles 55, 56 and tape guide post 63 so as to run in a forward direction indicated by an arrow F in FIG. 4, with data being recorded to the magnetic tape 26 by the rotary head 52a or the rotary head 52a reproducing data recording on the magnetic tape 26. When the capstan motor reverses and the capstan 54 is rotated in a clockwise direction, the magnetic tape 26 is rewound slightly, running in a reverse direction indicated by an arrow R in FIG. 4. The recording of information to the magnetic tape 26 proceeds by a process of reproducing the recorded location to confirm that recording is being accomplished. Accordingly, capstan 54 repeatedly rotates alternately in counterclockwise and clockwise directions, and consequently the magnetic tape 26 repeatedly runs alternately in forward and reverse directions.

Next, a description will be given of the supply reel tape guide post mechanism 60, with reference to FIGS. 5A and 5B, FIGS. 6A, 6B, 6C and 6D, FIGS. 7A and 7B, and FIGS. 8A, 8B and 8C.

Figure 6A:
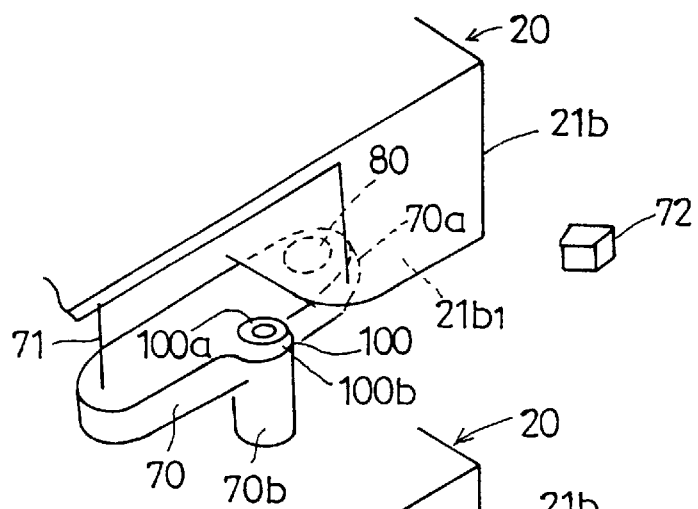
FIGS. 6A, 6B, 6C and 6D show movements of the tape guide post arm of the supply reel side tape guide post mechanism of FIGS. 5A and 5B during tape loading as viewed from the front of the tape cassette.
Figure 6B:
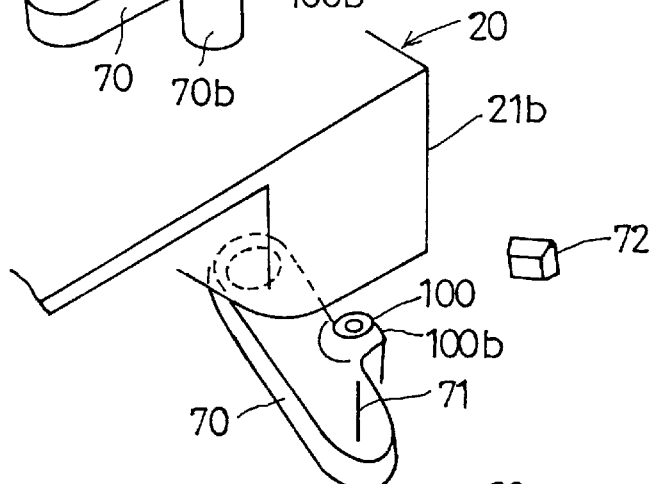
Figure 6C:
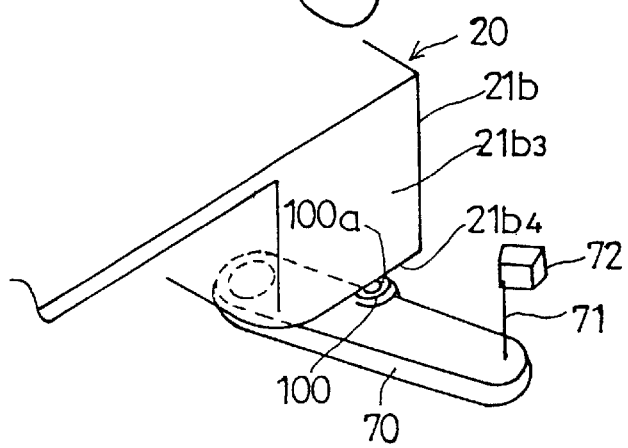
Figure 6D:
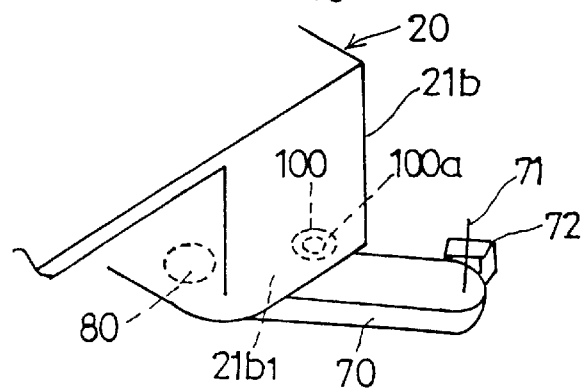
Figure 7A:
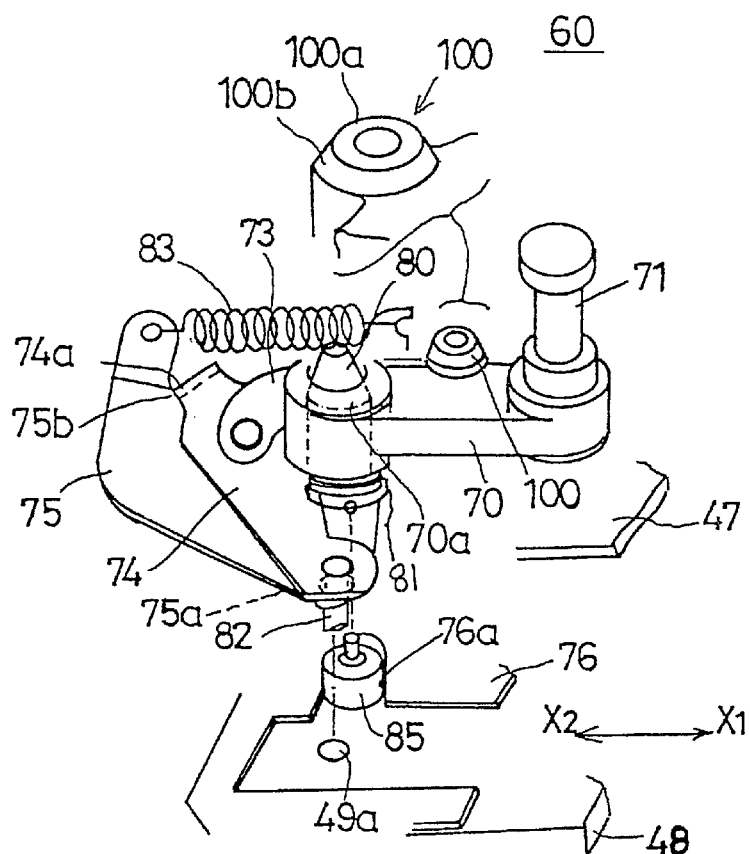
FIGS. 7A and 7B are perspective views of states of the supply reel side tape guide post mechanism before and after operation.
Figure 7B:
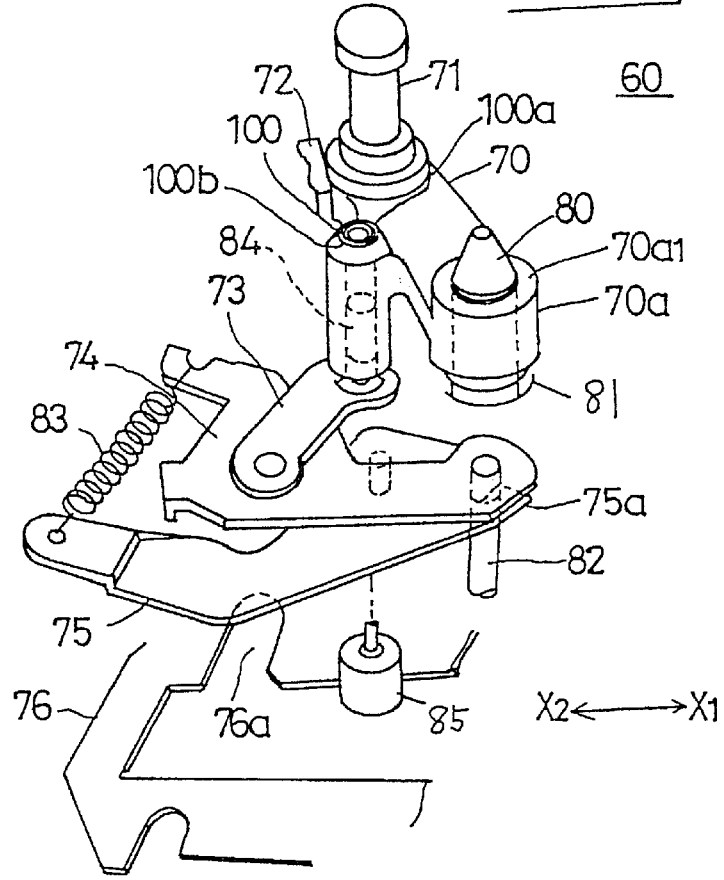
Figure 8A:
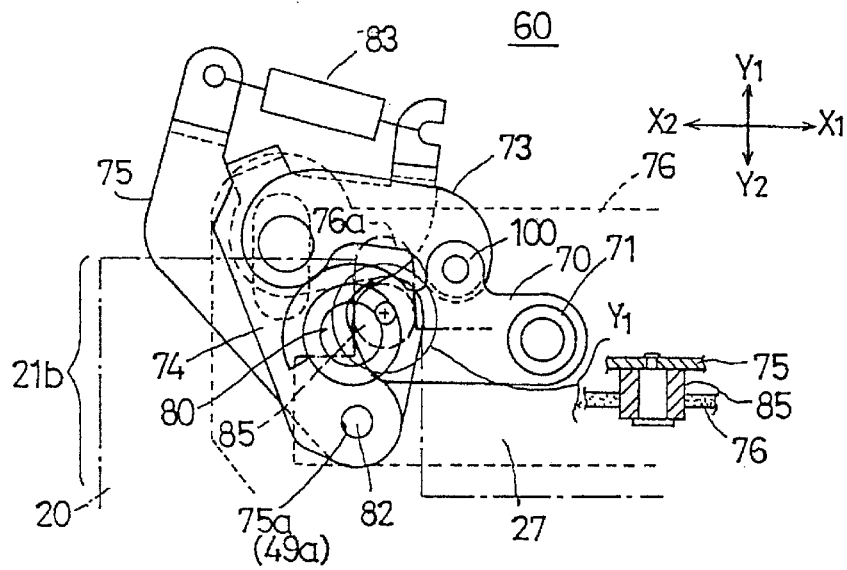
FIGS. 8A, 8B and 8C are perspective views of states of the supply reel side tape guide post mechanism before, during and after operation.
Figure 8B:
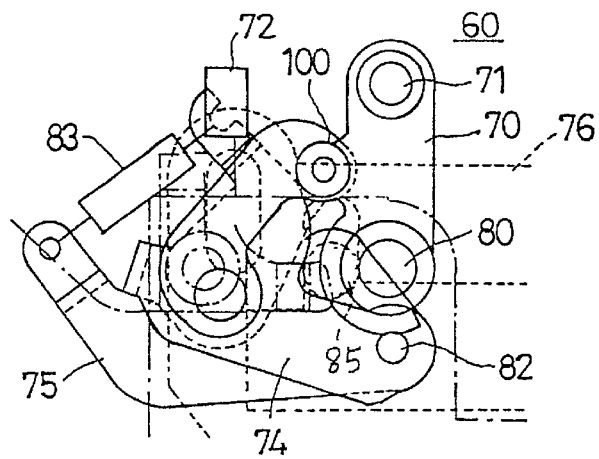

FIGS. 6A, 7A and 8A show a state prior to the commencement of a tape loading operation. FIGS. 6B, 6C and 8B show a state during tape loading operation. FIGS. 5A, 5B, 6D, 7B and 8C show a state after completion of tape loading operation.

As shown in FIG. 6A and FIG. 7A, the supply reel tape guide post mechanism 60 comprises a arm 70 (hereinafter referred to as arm 70), a supply reel tape guide post 71, a stopper 72, a link 73, a first operating arm 74, a second operating arm 75 and a cam plate 76.

The arm 70 is mounted on a top surface side of the sub-chassis 47. The stopper 72 is fixedly mounted on the top surface of the sub-chassis 47. The first operating arm 74, the second operating arm 75 and the cam plate 76 are mounted on a top surface side of the chassis 48.

The arm 70 has a bearing part 70a on a base side and a tape guide post 71 fixedly mounted on a forward edge side, and a tube part 70b at a central part as shown in FIGS. 6A and 7B. For ease of illustration, in FIGS. 6A, 6B, 6C and 6D, the tape guide post 71 has been simplified. The arm 70 fits the bearing part 70a to a cassette positioning mount 80 that is provided on the sub-chassis 48 so as to rotatably support the bearing part 70a by the cassette positioning mount 80. Further, the bearing part 70a is pushed upward in a Z1 direction by a spring 81.

The first operating arm 74 is provided with a spindle 82 that extends in a Z2 direction. The second operating arm 75 is mounted on a bottom side of the first operating arm 74 and engages the spindle 82 to a bearing hole 75a. The spindle 82 engages a bearing hole. 49a of the chassis 48, so that the first operating arm 74 and the second operating arm 75 can rotate independently. Between the first operating arm 74 and the second operating arm 75 a tension coil 83 is mounted, so that a bent portion 74a of the first operating arm 74 and a leading edge portion 75b of the second operaing arm 75 contact each other so as to form a single assembly.

One end of the link 73 is rotatably connected to the top surface of the first operating arm 74. The other end of the link 73 is provided with a pole 84 projecting in a Z1 direction. The pole 84 fits inside the central tube part 70b of the arm 70 described above.

A roller 85 is mounted on a bottom surface of the second operating arm 75. The roller 85 engages a concavity 76a formed In the cam plate 76 mounted on the top surface of the chassis 48. The cam plate is slid in the X2 direction by the tape loading operation of the tape loading mechanism 45.

As shown in FIGS. 6A, 7A and 8A, prior to the commencement of the tape loading operation the arm 70 is rotated to a position in the clockwise direction.

The DAT tape cassette 20 fits one positioning hole 21b2 to the cassette positioning mount 80 and fits the other positioning hole 21c2 to the corresponding cassette positioning mount 86, positioning and loading the DAT tape cassette 20. The bearing part 70a of the arm 70 is pushed slightly downward by the bottom surface 21b1 of the extending portion 21b of the DAT tape cassette 20 with some accompanying deformation of a compression spring 81, the arm 70 is pressed slightly downward and the arm 70 and the tape guide post 71 acquire a height corresponding to the height of the loaded DAT tape cassette 20.

Figure 8C:
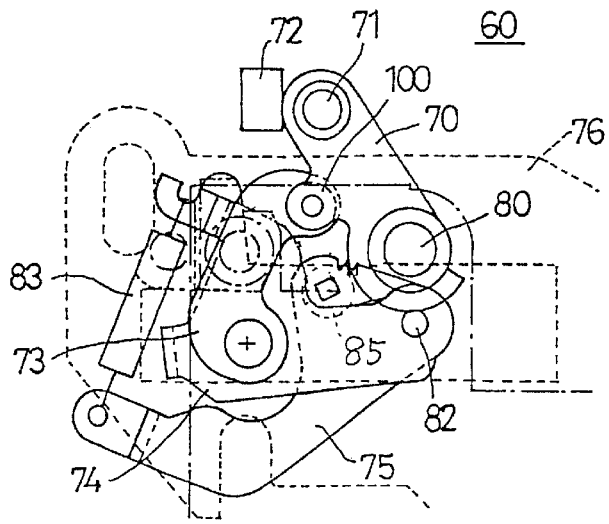

Next, the DAT streamer 50 tape loading mechanism 45 operates, the cam plate 76 is slid in the X2 direction and pushes the roller 85, and the second operating arm 75 is rotated in the counter-clockwise direction to a final position as shown in FIGS. 7B and 8C. In an initial stage, the first operating arm 74 and the second operating arm 75 are rotated counter-clockwise as a single assembly, the arm 70 is pulled by the link 73 and rotated counter-clockwise as shown in FIGS. 6B, 6C, 6D and 8B until pressed against the stopper 72. The second operating arm 75 continues to rotate further even after the arm 70 presses against the stopper 72, the second operating arm 75 stretching the tension coil 83 as it rotates independently of the first operating arm 74 to reach a state shown in FIG. 8C. In the final stage of rotating displacement of the second operating arm 75, the arm 70 presses against the stopper 72 due to the spring force of the tension spring 83.

In the plan view presented in FIG. 5A, the relation between a position Q1 at which a force F10 is exerted by the pole 84 on the arm 70 on the one hand and the line 90 on the other is such that the position Q1 is slightly offset from the line 90 by just a dimension J1 in a direction between the X2 and Y2 directions. Line 90 connects the positions at which the above-described force F10 causes the arm 70 to contact, that is, the position Q2 at which the arm 70 presses against the stopper 72 and the position Q3 at which the bearing part 70a presses against the cassette positioning mount 80 in a radial direction thereof.

Additionally, as shown in the side view presented in FIG. 5B, there is a difference in height J2 between a height H10 at which the force F10 acts and a height H11 at which a force F11 is exerted by the stopper 72 on the arm 70 as a reaction to force F10. Accordingly, a moment M10 rotating so as to tilt with respect to line 90 is exerted on the arm 70. As a result, the arm 70 tilts and the tip of the tape guide post 71 tilts in a direction between X1 and Y1.

Next, a description will be given of the distinctive feature of the present invention. As shown particularly in FIG. 7B, reference numeral 100 indicates a circular stepped projecting contacting part, formed on a top surface part of the tube part 70b of the arm 70. The portion of the top surface of the arm 70 at which the circular stepped projecting contacting part 100 is positioned is offset from the line 90 described above, in a direction between X2 and Y2. The circular stepped projecting contacting part 100 is formed so that a top surface 100a thereof has a height identical to a height of a top edge surface 70a1 of the bearing part 70a of the arm 70. Additionally, a guide portion 100b having a slanting surface is formed around an entire periphery of the circular stepped projecting contacting part 100.

Next, a description will be given of the operation of the circular stepped projecting contacting art 100 during a tape loading operation and during a recording/reproduction.

As shown in FIGS. 5A, 5B, 6D and 8C, in a state in which the arm 70 presses against the stopper 72, the circular stepped projecting contacting part 100 enters the extending portion 21b from a front side and contacts the bottom surface 21b1 of the extending portion 21b.

As a result, when the moment M10 is exerted as described above, the circular stepped projecting contacting part 100 presses against the bottom surface 21b1 of the extending portion 21b of the tape cassette housing 21 so that any tilting of the arm 70 is restricted even if the gap between the bearing part 70a and the cassette positioning mount 80 happens to be large. As a result, any tilting of the tape guide post 71 is also similarly restricted and thus the tape guide post 71 is retained in a vertical state.

Accordingly, the run of the magnetic tape 26 is stable, proper magnetic recording and reproduction can be carried out and the lateral edges of the magnetic tape 26 remain undamaged.

Additionally, by providing the circular stepped projecting contacting part 100 as described above, the height of the bearing part 70a can be decreased, making it possible to make the DAT streamer 50 thinner.

Additionally, as shown in FIGS. 6C and 6D, the circular stepped projecting contacting part 100 enters the bottom surface 21b1 of the extending portion 21b of the tape cassette housing 21 from a front side just before the arm 70 presses against the stopper 72. The reason for this is as follows.

When the arm 70 presses against the stopper 72, the arm 70 tilts due to the above-described moment M10, the circular stepped projecting contacting part 100 is displaced in the Z1 direction and it becomes difficult to enter the bottom surface 21b1 of the extending portion 21b from a front side. However, in the present embodiment the circular stepped projecting contacting part 100 is already disposed opposite the bottom surface 21b1 of the extending portion 21b before the arm 70 presses against the stopper 72, so the entry of the circular stepped projecting contacting part 100 into the bottom surface 21b1 of the extending portion 21b from a front side is carried out smoothly.

Additionally, the circular stepped projecting contacting part 100 has a guide part 10b, such that, even if the top surface of the circular stepped projecting contacting part 100 is slightly higher than the bottom surface 21b1 of the extending portion 21b upon approach of the circular stepped projecting contacting part 100 to the extending portion 21b, the circular stepped projecting contacting part 100 is guided by a corner part 21b4 formed by the positioning hole 21b2 in the bottom surface 21b1 of the extending portion 21b and a front side surface 21b3 of the extending portion 21b so as to smoothly enter the bottom surface 21b1 of the extending portion 21b from a front side.

It should be noted that the position at which the circular stepped projecting contacting part 100 is formed is not limited to the top surface portion of the tube part 70b of the arm 70 as described above but may be formed at any position that satisfies the above-described conditions.

Additionally, in the above-described embodiment, the DAT tape cassette 20 is loaded in such as way that the bottom surface thereof presses the top edge surface 70a1 of the bearing part 70a of the arm 70, so that a height position of the arm 70 is determined by a height position of the loaded DAT tape cassette. The top surface 100a of the circular stepped projecting contacting part 100 is formed to a height identical to that of the above-described top edge surface 70a1 of the bearing part 70a, so it is possible to restrict any tilting of the tape guide post 71 without regard to variations in the load position of the DAT tape cassette 20. In other words, even if the load position of the DAT tape cassette 20 varies somewhat, any titling of the tape guide post 71 will be restricted.

The take-up reel tape guide post mechanism 61 has a composition identical to that of the supply reel tape guide post mechanism 60 described above, using a bottom surface 21c1 of a extending portion 21c to restrict any tilting of the tape guide post 86.

The above description is provided in order to enable any person skilled in the art to make and use the invention and sets forth the best mode contemplated by the inventors of carrying out the invention.

The present invention is not limited to the above-described embodiment but may also, for example, be practiced by a configuration that uses a loaded cassette to control the movement of the tape guide post when the tape guide post extracts the magnetic tape from the loaded cassette. That is, the present invention is not limited to the specifically disclosed embodiment, and variations and modifications may be made without departing from the scope of the present invention.

What is claimed is:

1. A magnetic tape recording/reproducing apparatus for recording information to and reproducing information from a magnetic tape extracted from a cassette loaded in the apparatus, the magnetic tape recording/reproducing apparatus having a tape guide post mechanism comprising:

a tape guide post provided on a rotatably supported tape guide post arm which rotates until pressing against a stopper, the tape guide post extracting the magnetic tape from the cassette loaded in the apparatus;

an engaging part provided on the tape guide post arm to engage said tape guide post arm with a single assembled operating part associating with a tape loading mechanism for loading the magnetic tape from the cassette;

a contacting part provided on an edge of the engaging part of the arm, the contacting part contacting a bottom surface of the cassette loaded in the apparatus when the arm is rotated so as to extract the magnetic tape from the cassette; and wherein a tilting of the arm in a direction, in which the tape guide post tilts, is restricted in a state in which the arm presses against the stopper.

2. The magnetic tape recording/reproducing apparatus as claimed in claim 1, wherein the contacting part enters a bottom surface side of the cassette from a front side thereof before the arm rotates so as to press against the stopper.

3. The magnetic tape recording/reproducing apparatus as claimed in claim 1, wherein the contacting part comprises a guide part having a slanting surface on a side that first enters a bottom surface side of the cassette from the front side thereof when the arm has rotated.

4. A magnetic tape recording/reproducing apparatus for recording information to and reproducing information from a magnetic tape extracted from a cassette loaded in the apparatus, the magnetic tape recording/reproducing apparatus having a tape guide post mechanism comprising:

a positioning shaft positioning the cassette loaded in the apparatus;

a tape guide post arm having a bearing part and a tape guide post standing thereon, the arm engaged with the positioning shaft so as to be rotatably supported, a bottom surface of the cassette loaded in the apparatus pressing a top edge surface of the bearing part, the arm rotating until pressing against a stopper and the tape guide post extracting the magnetic tape from the cassette; and a contacting part formed on a part of the arm, a top surface of the contacting part having a height identical to a height of the top edge surface of the bearing part, the contacting part contacting a bottom surface of the cassette loaded in the apparatus when the arm rotates so as to extract the magnetic tape from the cassette, wherein a tilting of the arm in a direction in which the tape guide post tilts, is restricted in a state In which the arm presses against the stopper.

5. The magnetic tape recording/reproducing apparatus as claimed in claim 4, wherein the contacting part enters a bottom surface side of the cassette from a front side thereof before the arm rotates so as to press against the stopper.

6. The magnetic tape recording/reproducing apparatus as claimed in claim 4, wherein the contacting part comprises a guide part having a slanting surface on a side that first enters a bottom surface side of the cassette from the front side thereof when the arm has rotated.

* * * * *